Patented Apr. 9, 1946

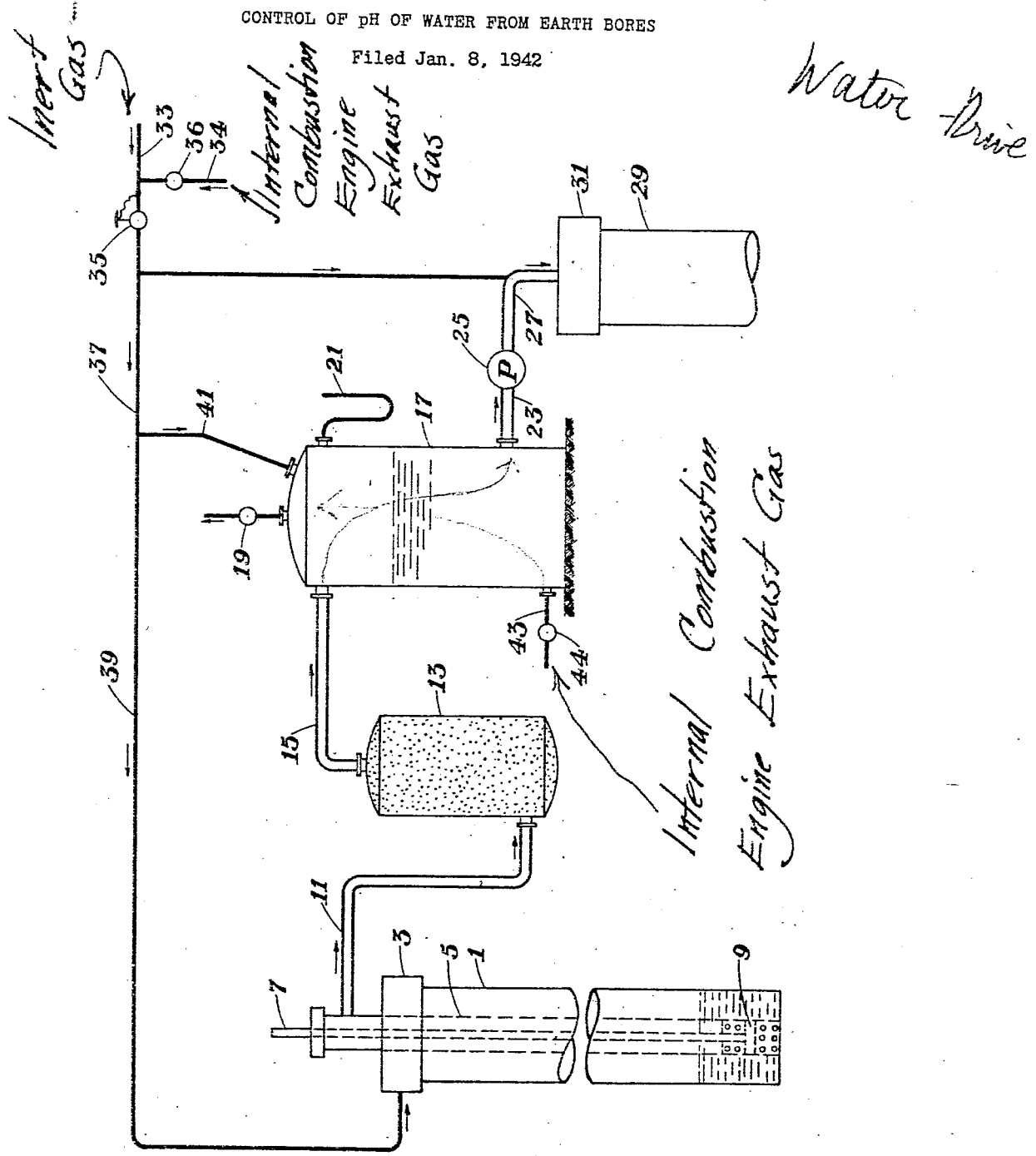

2,398,123

UNITED STATES PATENT OFFICE 2,398,123

CONTROL OF pH OF WATER FROM EARTH BORES

Wesley H. Sowers, Flossmoor, Ill., assignor to The Pure Oil Company, Chicago, Ill., a corporation of Ohio Application January 8, 1942, Serial No. 425,967

4 Claims. (Cl. 166—21)

This invention relates to the production of mineral oil and is more particularly concerned with the problems of flooding of oil wells, disposal of salt waters and the use of water drive in connection with the flooding of oil wells.

This invention is directed to the prevention of clogging of water injection or disposal wells by the use of exhaust gas from internal combustion engines as a blanket for the water to be injected whereby the water will be maintained at a pH value below that at which compounds, such as iron and aluminum compounds, dissolved in the water, precipitate.

It has become common practice in the art of producing petroleum to use water drive to increase the amount and rate of production. The water is forced under pressure into the injection well and penetrates the producing formation in the direction of the surrounding wells, thereby driving the oil toward the wells.

The water for the flooding is generally obtained by drilling one or more water wells in the vicinity of the producing wells and by pumping water from these wells to the producing wells. This water invariably contains a small percentage of iron in the form of soluble ferrous compounds, usually ferrous hydroxide. The iron content may vary from 0.5 part of iron per million parts of water to 5 or more parts of iron per million, depending upon the formation from which the water is obtained.

It is known that this iron is precipitated when pumped into the injection well and deposits on the walls of the well in the form of a gel thereby either greatly reducing the quantity of water that can be forced into the well, or making it totally impossible to inject additional water. A similar problem is encountered in returning salt water to various subterranean strata as a means of disposal of the water. Since Federal and State regulations prohibit the dumping of salt water into surface streams or accumulation in pits for disposal during high water periods, salt water disposal has become a vitally important problem in connection with oil production.

In order to avoid the precipitation of iron with its attendant consequences, it has been common practice to aerate the water by blowing air therethrough in tanks whereby iron is precipitated and then to filter the aerated water through beds of sand of various degrees of fineness to remove the precipitated iron and other solid material from the water. It has been considered necessary to reduce the iron content of the water below .5 part per million in order to get satisfactory results. However, it has been found that although the treatment of water in the manner just described delays the clogging of the injecting well, it does not entirely avoid it.

In Wagner et al. Patent No. 2,152,779 it was disclosed that the difficulties previously encountered could be overcome if the well water was injected into the injection well without any treatment, and air entirely excluded from contact with the water. It was further pointed out that the iron present in solution in the well water would remain in solution after injection into the injection well provided the well was blanketed with an inert gas.

While this method of injecting water has for the most part eliminated the difficulties heretofore encountered, it is not always adequate to prevent precipitation of compounds from the water since the precipitation of compounds from the water is not only a function of the state of oxidation of various ions, but is also dependent upon the hydrogen ion concentration of the water. The maintenance of a proper hydrogen ion concentration, (generally expressed in terms of pH values), in conjunction with the method disclosed in the Wagner et al. patent, will completely prevent the precipitation of such compounds as the hydroxides of iron and aluminum, as well as those of other metals the salts of which are present in the water.

The water at the source is generally under considerable pressure and in bringing the water to the surface of the ground, the pressure is largely if not entirely released. Gases previously dissolved in the water escape. If these gases are gases that impart an acid reaction to the water, the pH value will increase as the gases leave the water. This causes the precipitation of those compounds which are highly insoluble in the higher pH range. This may be prevented by using exhaust gas from internal combustion engines, the water solution of which will reduce the pH value to its former figure. Such gas may be used either alone or in conjunction with other gases, the primary function of which is to exclude air, as for example, hydrocarbon gases. The use of gases which are inert toward the salt water, to prevent oxidation of those compounds which precipitate upon oxidation, as for example, hydrocarbon gases, will permit the use of smaller quantities of the exhaust gas used to alter the pH value of the water.

In accordance with my invention a convenient and economical combination of gases which may be used to prevent access of air and to maintain a pH range of less than 7 is hydrocarbon gas and exhaust gas from an internal combustion engine. The hydrocarbon gas acts as an inert gas preventing access of oxygen by a blanketing effect and the exhaust gas, due to its content of carbon dioxide, sulfur dioxide and possibly other acid gases, will dissolve in the water and maintain a low pH value. Obviously, the exhaust gas may be used alone if so desired.

In one manner of carrying out the invention, water at the subsurface source containing considerable carbon dioxide under pressure and therefore tending to undergo an increase in pH value as the pressure is diminished or removed at the surface, is pumped from the water well to the injection well under a blanket of gases such as internal combustion engine exhaust gases or a mixture of these gases and hydrocarbon gases. The hydrocarbon gases may be obtained from storage tanks or directly from wells in the vicinity. Exhaust gases are also generally readily available from Diesel or gasoline engines generally operating in such areas. A small gas pressure is kept above the water in the water wells as well as above the water in the injection well. In this way access of air to the water is prevented and at the same time, due to the solubility of acidic components of the exhaust gases, the pH value of the water is maintained at a sufficiently low figure to prevent precipitation of compounds which would otherwise precipitate, such as compounds of iron and aluminum. The water, therefore, passes unchanged from one well to the other. It may be desirable to bring the internal combustion engine exhaust gas into intimate contact with the water, as for example, by bubbling through a body of the water in a tank.

The accompanying drawing, the single figure of which is a diagrammatic side elevational view, illustrates apparatus suitable for carrying out the invention.

Referring to the drawing, the numeral 1 represents a water well closed at the top by means of closure member 3 in order to prevent access of air into the well. Tubing 5 extends through the closure to the bottom of the well. A polish rod 7, located inside the tubing 5, has a pump 9 fastened to the lower end thereof. The polish rod is adapted to be reciprocated up and down in the tubing 5 and is properly packed at the point where it passes through the upper end of the tubing in order to prevent leakage of air into the tubing.

The upper end of tubing 5 is connected by means of conduit 11 to an air tight sand filter 13 which may preferably be made up of successive layers of sand, each of finer mesh than the next lower layer. In passing through the sand bed, any suspended material present in the water is removed. It is desirable to remove suspended matter since it clogs up the minute pores in the producing formation. The filtered water leaves the top of the sand filter through conduit 15 and passes to closed storage tank 17. The top of the tank is provided with a safety pop valve 19 to relieve excess pressure in the tank. The tank is also provided with a U-tube 21, sealed with oil or mercury in order to determine the pressure within the tank.

A conduit 23 connects the lower portion of tank 17 with a pump 25 which in turn is connected by conduit 27 to the top of an injection well 29. The top of the well 29 is closed by closure or cap 31 to prevent air from entering the well.

The pipe 33 is connected to any suitable source of inert gas and the pipe 34 to a source of internal combustion engine exhaust gas. Valve 36 permits feeding the exhaust gas from an internal combustion engine into the system in any desired proportion. A pressure regulator 35 permits a control of a fixed pressure on the system. In this particular case a pressure of ¼ pound above atmospheric has been found satisfactory. From the line 33 the gases enter line 37 from which distribution is effected to line 39 entering the top of the water well, line 41 entering the top of the water tank 17, and line 42 which joins conduit 27 and through which both gas and water flow into injection well 29. The maintenance of a blanket of gases above the water in the wells and in the storage tank, at a pressure slightly above atmospheric, insures against leakage of air into contact with the water. Additional exhaust gas from an internal combustion engine may be brought into intimate contact with the water by injecting it into a body of the water maintained in tank 17 through valve-controlled pipe 43. The amount of exhaust gas from an internal combustion engine to be used can be readily determined by laboratory analysis of the particular water to be handled. After it is determined and the nature and quantity of salts present in the water is known, it can readily be determined what quantity of gas is necessary to give a pH value to the water which will prevent precipitation. For example, ferrous hydroxide precipitates at a pH of 5 and aluminum hydroxide at a pH of 4. To prevent the precipitation of these compounds it would be necessary to use exhaust gas from an internal combustion engine in sufficient amount to maintain the water at a pH value of less than 4.

Thus, in accordance with this invention, water containing relatively large amounts of compounds soluble under the conditions prevailing at the source of the water and which would precipitate upon the increase of pH value of the water frequently incurred in passing from the source to the injection well, are prevented from precipitating and the water can be injected directly into earth bores without running any risk of clogging the bore hole. This discovery eliminates the use of expensive treating methods and enables the production of larger amounts of oil or disposal of larger quantities of salt water because of the greater amounts of water that can be forced through the subsurface strata.

This application is a continuation-in-part of application Serial Number 240,618, filed November 16, 1938, in the name of Wesley H. Sowers.

What I claim is:

1. In the transfer into an earth bore of water tending to increase in pH value and containing iron compounds in solution in sufficient quantity to clog the walls of the earth bore upon precipitation and which precipitate upon oxidation and/or increase in pH value, the method of preventing clogging of said earth bore into which is injected said water, which comprises maintaining the water at its source under a blanket of gas containing exhaust gas from internal combustion engines under such conditions as to maintain the pH of the water below an amount where objectionable compounds precipitate from the water, transferring the water from its source to the injection bore under a blanket of said gas and injecting the water without treatment to remove said compounds therefrom into the injection bore under a blanket of said gas.

2. In the transfer into an earth bore of water tending to undergo an increase in pH value and containing iron compounds in solution in sufficient quantity to clog the walls of the earth bore upon precipitation and which precipitate on oxidation and/or increase in pH value, the method of preventing precipitation of said compounds and clogging of said earth bore into which is injected said water, which comprises maintaining said water under a blanket of a mixture of gases comprising inert substantially insoluble gas and exhaust gas from internal combustion engines under such conditions that a sufficient amount of acidic gas dissolves in the water to prevent precipitation of objectionable compounds therefrom, and transferring said water from its source to the earth bore through a closed conduit without subjecting it to treatment to remove any precipitated compounds.

3. The method of flooding oil-bearing formations by injection through an earth bore of water containing appreciable quantities of iron compounds which precipitate on oxidation and/or increase in pH value and clog the walls of said bore, which comprises withdrawing from a well through a closed conduit, water as aforesaid tending to undergo an increase in pH value, transferring the water through a closed conduit to a closed container in which the water is maintained under a gaseous blanket containing exhaust gas from internal combustion engines under such conditions as to cause a sufficient amount of acidic gas to dissolve in the water to prevent precipitation of objectionable compounds therefrom, and transferring water from said container through a closed conduit to an injection well.

4. In the transfer into a well bore of water tending to increase in pH value and containing appreciable quantities of iron and aluminum compounds which precipitate upon oxidation and/or increase in pH value and clog the walls of said bore, the method of preventing clogging of said earth bore into which is injected said water which comprises maintaining said water under a blanket of gas containing exhaust gas from internal combustion engines under conditions such that the pH of the water is maintained below about 4 and transferring said water from its source to the earth bore through a closed conduit without subjecting it to treatment to remove precipitated compounds.

WESLEY H. SOWERS.